US010432288B2

(12) United States Patent
Kwak et al.

(10) Patent No.: US 10,432,288 B2
(45) Date of Patent: Oct. 1, 2019

(54) METHOD AND APPARATUS FOR REPORTING CHANNEL STATE INFORMATION IN WIRELESS COMMUNICATION SYSTEM

(71) Applicant: Samsung Electronics Co., Ltd., Suwon-si, Gyeonggi-do (KR)

(72) Inventors: Youngwoo Kwak, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/800,723

(22) Filed: Nov. 1, 2017

(65) Prior Publication Data
US 2018/0123668 A1 May 3, 2018

(30) Foreign Application Priority Data
Nov. 1, 2016 (KR) .................. 10-2016-0144714

(51) Int. Cl.
*H04B 7/06* (2006.01)
*H04L 5/00* (2006.01)

(52) U.S. Cl.
CPC ......... *H04B 7/0626* (2013.01); *H04B 7/0645* (2013.01); *H04B 7/0658* (2013.01);
(Continued)

(58) Field of Classification Search
CPC .. H04B 7/0626; H04B 7/0658; H04B 7/0617; H04B 7/0632; H04B 7/0639;
(Continued)

(56) References Cited

U.S. PATENT DOCUMENTS

| 9,554,297 B2 * | 1/2017 | Han | H04W 4/70 |
| 2013/0301454 A1 * | 11/2013 | Seol | H04B 7/043 370/252 |

(Continued)

FOREIGN PATENT DOCUMENTS

| WO | 2016159623 A1 | 10/2016 |
| WO | 2017-171507 A1 | 10/2017 |

OTHER PUBLICATIONS

Xinwei, 'Further discussion on hybrid CSI report for eFD-MIMO', R1-166580, 3GPP TSG RAN WG1 Meeting #86, Gothenburg, Sweden, Aug. 12, 2016.
(Continued)

*Primary Examiner* — Magdi Elhag
(74) *Attorney, Agent, or Firm* — Jefferson IP Law, LLP

(57) ABSTRACT

A communication technique is provided for converging a 5$^{th}$ generation (5G) communication system for supporting higher data rates beyond a 4$^{th}$ generation (4G) system with an Internet of things (IoT) technology. The present disclosure may be applied to intelligent services based on the 5G communication technology and the IoT-related technology, such as smart home, smart building, smart city, smart car or connected cars, health care, digital education, smart retail, security and safety services. A method for receiving channel state information (CSI) according to an embodiment of the present disclosure includes transmitting configuration information on hybrid CSI, the configuration information including configuration on two enhanced multiple input multiple output (eMIMO) types and first information indicating for which an eMIMO type a CSI reporting is triggered transmitting second information triggering the CSI reporting, and receiving the CSI based on the second information and configuration information, and wherein the CSI is associated with the eMIMO type indicated by the first information.

20 Claims, 10 Drawing Sheets

(52) U.S. Cl.
CPC ............ *H04L 5/005* (2013.01); *H04L 5/0023*
(2013.01); *H04L 5/0053* (2013.01); *H04L*
*5/0057* (2013.01); *H04L 5/0092* (2013.01)

(58) Field of Classification Search
CPC .. H04B 7/0417; H04B 7/0456; H04B 7/0452;
H04B 7/0413; H04B 7/0643; H04B
7/0645; H04W 7/0645; H04L 5/0023;
H04L 5/005; H04L 5/0053; H04L 5/0057;
H04L 5/0092
See application file for complete search history.

(56) References Cited

U.S. PATENT DOCUMENTS

| | | | |
|---|---|---|---|
| 2016/0072562 A1 | 3/2016 | Onggosanusi et al. | |
| 2016/0080052 A1* | 3/2016 | Li | H04B 7/0456 375/267 |
| 2016/0359538 A1* | 12/2016 | Onggosanusi | H04B 7/0469 |
| 2017/0033912 A1* | 2/2017 | Onggosanusi | H04B 7/0626 |
| 2017/0134080 A1* | 5/2017 | Rahman | H04B 7/0456 |
| 2017/0195031 A1* | 7/2017 | Onggosanusi | H04B 7/0626 |
| 2017/0237478 A1* | 8/2017 | Kwak | H04B 7/0626 370/329 |
| 2017/0310377 A1* | 10/2017 | Kang | H04B 7/0452 |
| 2018/0198497 A1* | 7/2018 | Wei | H04B 7/0639 |
| 2018/0220406 A1* | 8/2018 | Mizusawa | H04B 7/04 |
| 2018/0294848 A1* | 10/2018 | Park | H04B 7/0417 |
| 2019/0097693 A1* | 3/2019 | Park | H04L 5/0053 |

OTHER PUBLICATIONS

Nokia et al., 'Remaining Details of Hybrid CSI Reporting', R1-1608932, 3GPP TSG-RAN WG1#86bis, Lisbon, Portugal, Sep. 30, 2016.
Samsung, 'Completing mechanism 1 of hybrid CSI for Rel.14', R1-1610424, 3GPP TSG RAN WG1 Meeting #86bis, Lisbon, Portugal, Oct. 18, 2016.
3GPP TS 36.213 v13.3.0, '3GPP; TSGRAN; E-UTRA; Physical layer procedures (Release 13)', Sep. 29, 2016.
Extended European Search Report dated Jun. 19, 2019, issued in a counterpart European application No. 17867079.0-1220/3491749.
EPICSSON: "Hybrid CSI Reporting with One and Two CSI Processes", R1-165098; May 14, 2016; Nanjing, China.
LG Electronics: "Remaining details on Hybrid CSI-RS", R1-1609200; Oct. 9, 2016; Lisbon, Portugal.

* cited by examiner

METHOD AND APPARATUS FOR REPORTING CHANNEL STATE INFORMATION IN WIRELESS COMMUNICATION SYSTEM

CROSS-REFERENCE TO RELATED APPLICATION(S)

This application claims the benefit under 35 U.S.C. § 119(a) of a Korean patent application filed on Nov. 1, 2016, in the Korean Intellectual Property Office and assigned Serial No. 10-2016-0144714, the entire disclosure of which is hereby incorporated by reference.

TECHNICAL FIELD

The present disclosure relates to a wireless communication system. More particularly, the present disclosure relates to a method for reporting channel state information.

BACKGROUND

In order to meet the demand for wireless data traffic that is on an increasing trend after commercialization of 4th generation (4G) communication systems, efforts have been made to develop improved 5th generation (5G) or pre-5G communication system. For this reason, the 5G or pre-5G communication system is also called a beyond 4G network communication system or a post long term evolution (LTE) system. In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming using array antennas, massive multiple input and multiple output (MIMO), full dimension MIMO (FD-MIMO), hybrid beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid frequency shift keying (FSK) and quadrature amplitude modulation (QAM) modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, M2M communication, and MTC have been implemented by techniques for beam-forming, MIMO, and array antennas, which correspond to the 5G communication technology. As the big data processing technology as described above, application of a cloud RAN would be an example of convergence between the 5G technology and the IoT technology.

In a wireless communication system, a reference signal is used to measure a radio channel state, and the measured channel state is used to determine what data rate a receiver requests from a transmitter.

However, since radio resources used for wireless communication are limited, a radio resource allocated to such a reference signal should be properly determined. In particular, in the case of applying FD-MIMO technology, the reference signal should be efficiently allocated. Due to such necessity, a hybrid channel status indication reference signal (CSI-RS) may be used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for efficiently operating such a hybrid channel status indication reference signal (CSI-RS). Specifically, the present disclosure provides a method for triggering an aperiodic channel state information report in the hybrid CSI-RS.

Various embodiments of the present disclosure are directed to the provision of a method for receiving channel state information (CSI) comprising transmitting configuration information on hybrid CSI, the configuration information including configuration on two enhanced multiple input multiple output (eMIMO) types and first information indicating for which an eMIMO type a CSI reporting is triggered, transmitting second information triggering the CSI reporting, and receiving the CSI based on the second information and configuration information, wherein the CSI is associated with the eMIMO type indicated by the first information.

Various embodiments of the present disclosure are directed to the provision of a method for reporting CSI comprising receiving configuration information on hybrid CSI, the configuration information including configuration on two enhanced multiple input multiple output (eMIMO) types and first information indicating for which an eMIMO type a CSI reporting is triggered, receiving second information triggering the CSI reporting, and transmitting the CSI based on the second information and configuration information, wherein the CSI is associated with the eMIMO type indicated by the first information.

Various embodiments of the present disclosure are directed to the provision of a base station for receiving CSI comprising a transceiver configured to transmit and receive signals, and a controller coupled with the transceiver and configured to control to transmit configuration information on hybrid CSI, the configuration information including configuration on two enhanced multiple input multiple output (eMIMO) types and first information indicating for which an eMIMO type a CSI reporting is triggered, transmit second information triggering the CSI reporting, and receive the CSI based on the second information and configuration information, wherein the CSI is associated with the eMIMO type indicated by the first information.

Various embodiments of the present disclosure are directed to the provision of a terminal for reporting CSI comprising a transceiver configured to transmit and receive signals, and a controller coupled with the transceiver and configured to control to receive configuration information on hybrid CSI, the configuration information including configuration on two enhanced multiple input, multiple output (eMIMO) types and first information indicating for which an eMIMO type a CSI reporting is triggered, receive second information triggering the CSI reporting, and transmit the CSI based on the second information and configuration information, wherein the CSI is associated with the eMIMO type indicated by the first information. According various to embodiments of the present disclosure, the channel state information can be transmitted and received through efficient triggering of the aperiodic channel state report using the hybrid CSI-RS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
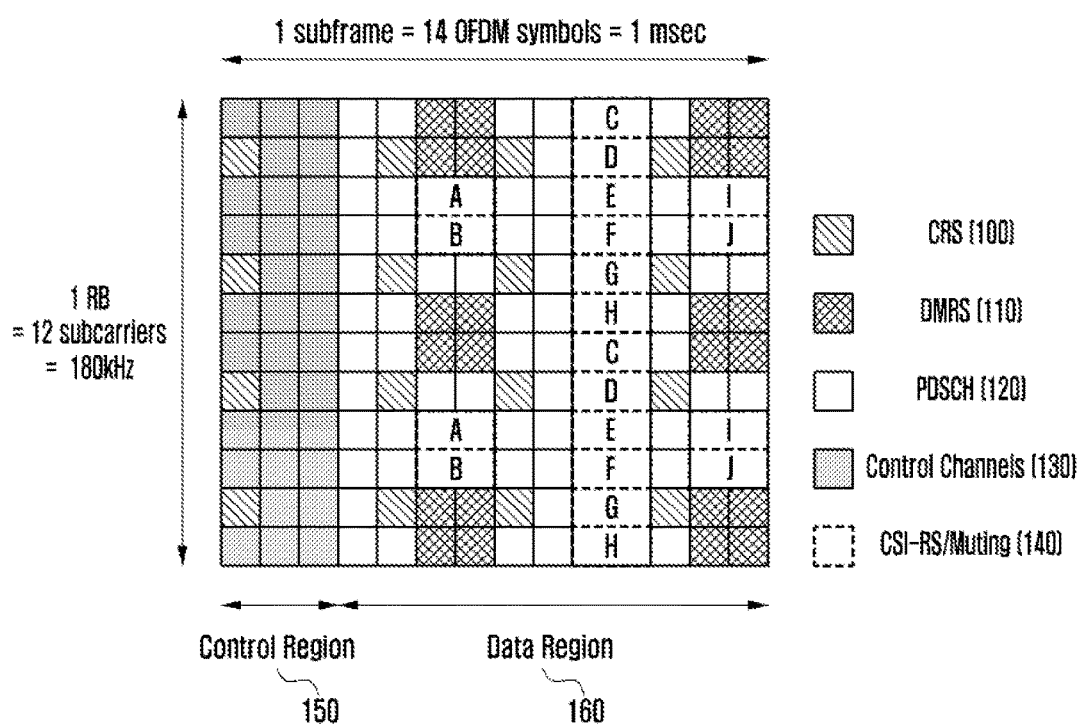
FIG. 1 is a diagram illustrating radio resources for one subframe and one resource block (RB) which are the minimum units for downlink scheduling in long term evolution (LTE) and LTE-advanced (LTE-A) systems according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

In the following description, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as field-programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing unit (CPUs) in a device or a security multimedia card.

Further, in describing the present disclosure, a detailed description of related known functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

In the following description, although a new radio access technology (NR) system, a long term evolution (LTE) system, and an LTE-advanced (LTE-A) system are exemplarily described, the present disclosure can be applied to other communication systems using a licensed band and an unlicensed band without any separate addition and subtraction.

The present disclosure relates to a general wireless mobile communication system, and more particularly, to a wireless mobile communication system adopting a multiple access scheme using a multi-carrier, such as an orthogonal frequency division multiple access (OFDMA).

At present, a mobile communication system has been developed to a high-speed and high-quality wireless packet data communication system in order to provide data services and multimedia services over initial voice oriented services. For this, several standardization groups, such as the $3^{rd}$ generation partnership project (3GPP), the $3^{rd}$ generation partnership project 2 (3GPP2), and the Institute of Electrical and Electronics Engineers (IEEE), are proceeding with 3rd-generation evolved mobile communication system standards adopting a multiple access method using multi-carriers. Recently, various mobile communication standards, such as 3GPP LTE, 3GPP2 ultra mobile broadband (UMB), and IEEE 802.16m, have been developed to support high-speed and high-quality wireless packet data transmission services based on a multiple access method using multi-carriers.

The existing 3rd-generation evolved mobile communication systems, such as LTE, UMB, and 802.16m, are based on the multi-carrier multiple access method, adopt a multiple input multiple output (MIMO) to improve transmission efficiency, and are featured to use various technologies, such as beam-forming, adaptive modulation and coding (AMC), and channel sensitive scheduling. The various technologies as described above improve the system capacity performance through improvement of the transmission efficiency through methods for concentrating transmission powers transmitted from several antennas in accordance with the channel quality, adjusting the amount of data being transmitted, and selectively transmitting data to users having good channel quality.

Since such techniques mostly operate based on channel state information between a base station (BS) (or an evolved Node B (eNB)) and a terminal (or user equipment (UE) or a mobile station (MS)), it is necessary for the eNB or UE to measure the channel state between the base station and the terminal, and in this case, a channel status indication reference signal (CSI-RS) is used. The above-described eNB means a downlink transmission and uplink reception device located in a predetermined place, and one eNB performs transmission/reception for a plurality of cells. In one mobile communication system, a plurality of eNBs are geometrically distributed, and each of the plurality of eNBs performs transmission/reception for the plurality of cells.

The existing 3rd-generation and 4th-generation mobile communication systems, such as LTE and LTE-A, use MIMO technology to transmit data using a plurality of transmission/reception antennas for extension of the data rate and system capacity. The MIMO technology makes it possible to spatially separate and transmit a plurality of information streams using a plurality of transmission/reception antennas. Such spatial separation and transmission of the plurality of information streams may be called spatial multiplexing.

In general, the number of information streams to which spatial multiplexing can be applied may differ depending on the number of antennas used by a transmitter and a receiver. In general, the number of information streams to which the spatial multiplexing can be applied is called a rank of the corresponding transmission. In the case of the MIMO technology that is supported in the standards up to LTE-A Release 11, spatial multiplexing is supported with respect to a case where 16 transmission antennas and 8 reception antennas are provided, and the rank is supported up to 8 at maximum.

In the case of an NR that is the 5th-generation mobile communication system currently being discussed, the design target of the system is to support various services, such as enhanced mobile broadband (eMBB), massive machine type communication (mMTC), and ultra-reliable and low latency communications (URLLC), as described above, and in order to achieve the target, the reference signal to be always transmitted is minimized and is aperiodically transmitted to flexibly use time and frequency resources.

The reference signal is a signal that is used to help demodulation and decoding of data symbols received through measurement of the channel state between a base station and users, such as channel intensity or distortion, interference strength, or Gaussian noise, in a wireless mobile communication system.

Another purpose of the reference signal is to measure a radio channel state. A receiver can determine the state of a radio channel between the receiver itself and a transmitter through measurement of the reception intensity of the reference signal that is transmitted by the transmitter with an engaged transmission power and then is received by the receiver through the radio channel. The radio channel state determined as described above is used to determine what data rate the receiver requests from the transmitter.

However, in the case of a general mobile communication system, radio resources, such as signal transmission time, frequency, and transmission power, are limited, and if a large amount of radio resources is allocated to the reference signal, the radio resources that can be allocated to a data signal may be relatively reduced. Due to this, the radio resources allocated to the reference signal should be properly determined in consideration of the system throughput. In particular, in the case of adopting the MIMO technology that performs transmission and reception using a plurality of antennas, allocation of the reference signal and the measurement thereof may be very important technical matters.

In order to support up to 32 antennas, Rel-13 FD-MIMO and Rel-14 eFD-MIMO of LTE support a non-precoded CSI-RS (hereinafter commonly used with class A) and beamformed CSI-RS (hereinafter commonly used with class B). In the case of the non-precoded CSI-RS, a terminal reports a rank indicator (RI), a precoding matrix indicator (PMI), and a channel quality indicator (CQI) to a base station based on the respective measured antennas based on wide beams like the existing ones, and the base station performs data scheduling based on this. In the case of the beamformed CSI-RS, in order to reduce the number of CSI-RS antenna ports (APs) that the terminal should measure at a time and to reduce overhead for the whole CSI-RS, the base station divides the whole wide area into specific beams to be transmitted, and the terminal selects this, so that the overhead for the reference signal and terminal complexity can be reduced. The beamformed CSI-RS may be divided into a cell-specific CSI-RS and a UE-specific CSI-RS.

As described above, different from the cell-specific CSI-RS that proceeds with the channel state information report through selection of divided beams in a cell dimension, the UE-specific CSI-RS transmits an optimized beam to the terminal so that the terminal reports the channel state based on this, and thus the reference signal overhead can be minimized. However, such a method has the drawback that prior channel state information should be secured using a sounding reference signal (SRS), non-precoded CSI-RS, and cell-specific beamformed CSI-RS. Accordingly, in order to combine the above-described advantages and to make up for the shortcomings thereof, a hybrid CSI-RS, in which the above-described CSI-RSs are combined with each other, may be used. The present disclosure proposes a method for triggering an aperiodic channel state report through such a hybrid CSI-RS.

FIG. 1 is a diagram illustrating radio resources for one subframe and one resource block (RB), which are the minimum units for downlink scheduling in LTE and LTE-A systems according to an embodiment of the present disclosure.

Referring to FIG. 1, a radio resource is composed of one subframe on a time axis and one RB on a frequency axis. The radio resource is composed of 12 subcarriers in a frequency domain and 14 OFDM symbols in a time domain to have 168 inherent frequency and time locations in total. In LTE and LTE-A, each of the inherent frequency and time locations as shown in FIG. 1 is called a resource element (RE).

From the radio resource as illustrated in FIG. 1, different kinds of plural signals may be transmitted as follows.

1. Cell specific RS (CRS) 100: This is a reference signal periodically transmitted for all terminals belonging to one cell, and a plurality of terminals may commonly use the CRS.

2. Demodulation reference signal (DMRS) 110: This is a reference signal transmitted for a specific terminal, and it is transmitted only in the case where data is transmitted to the corresponding terminal. The DMRS may be composed of 8 DMRS APs (hereinafter, can be mixedly used with ports) in total. In the LTE and LTE-A, ports 7 to 14 correspond to DMRS ports, and the respective ports maintain orthogonality so that no interference occurs between them using code division multiplexing (CDM) or frequency division multiplexing (FDM).

3. Physical downlink shared channel (PDSCH) 120: This is a data channel transmitted to a downlink, and it is used by a base station to transmit traffic to a terminal. The PDSCH is transmitted using an RE in which a reference signal is not transmitted in a data region 160 of FIG. 1.

4. Channel status information and reference signal (CSI-RS) 140: This is a reference signal transmitted for terminals belonging to one cell, and it is used to measure a channel state. A plurality of CSI-RSs may be transmitted to one cell.

5. Other control channels (physical HARQ indicator channel (PHICH), physical control format indicator channel (PCFICH), and physical downlink control channel (PDCCH)) 130: These control channels are used to provide control information that is necessary for a terminal to receive the PDSCH or to transmit reception acknowledgement (ACK) or negative reception acknowledgement (NACK) for operating a hybrid ARQ (HARQ) for uplink data transmission in a control region 150 of FIG. 1.

In addition to the above-described signals, in the LTE-A system, muting may be configured so that CSI-RSs transmitted by other base stations can be received by terminals of the corresponding cell without interference. The muting may be applied in a location in which the CSI-RSs can be transmitted, and in general, a terminal receives a traffic signal through jumping over the corresponding radio resource. In the LTE-A system, the muting may be called zero-power CSI-RS as another term. This is due to the characteristic of the muting. The muting is applied to the location of the CSI-RS and there is not transmission power of the corresponding radio resource.

Referring to FIG. 1, the CSI-RSs may be transmitted using parts of locations indicated as A, B, C, D, E, F, G, H, I, and J in accordance with the number of antennas that transmit the CSI-RSs. Further, the muting may be applied to parts of the locations indicated as A, B, C, D, E, F, G, H, I, and J. In particular, the CSI-RSs may be transmitted using 2, 4, and 8 REs in accordance with the number of APs being transmitted. In FIG. 1, if the number of APs is 2, the CSI-RSs are transmitted to a half of a specific pattern, whereas if the number of APs is 4, the CSI-RSs are transmitted to the whole of the specific pattern. If the number of APs is 8, the CSI-RSs are transmitted using two patterns. In contrast, the muting is always composed of one pattern unit. That is, the muting may be applied to a plurality of patterns, but if the location of the muting does not overlap the location of the CSI-RS, it cannot be applied to only a part of one pattern. However, only in the case where the location of the CSI-RS overlaps the location of the muting, the muting can be applied to only a part of one pattern.

In the case where the CSI-RSs for two APs are transmitted, two REs connected together on a time axis transmit signals of respective APs, and the signals of the respective APs are discriminated from one another by orthogonal codes. Further, if the CSI-RSs for four APs are transmitted, signals for two additional APs are transmitted in the same method further using two REs added to the CSI-RSs for the two APs. Transmission of the CSI-RSs for 8 APs is performed in the same manner. In the case of CSI-RSs supporting 12 and 16 APs, they are transmitted through combination of three CSI-RS transmission locations for the four existing APs or through combination of two CSI-RS transmission locations for eight APs.

Further, a terminal can be allocated with CSI-IMs (or interference measurement resources (IMRs)) together with the CSI-RSs, and the CSI-IM resources have the same resource structure and location as those of the CSI-RSs supporting 4 ports. The CSI-IM is a resource for a terminal that receives data from one or more base stations to accurately measure interference with an adjacent base station. For example, if it is desired to measure the amount of interference when the adjacent base station transmits data and the amount of interference when the adjacent base station does not transmit the data, the base station configures a CSI-RS and two CSI-IM resources. The base station can effectively measure the amount of interference exerted by the adjacent base station in a manner that it makes the adjacent base station always transmit a signal on one CSI-IM whereas it makes the adjacent base station always not transmit the signal on the other CSI-IM.

Table 1 below indicates an RRC field forming CSI-RS configuration.

TABLE 1

| CSI-RS config | CSI-IM config | CQI report config | Etc |
|---|---|---|---|
| No. antenna ports | Resource config | Periodic Mode, resource, periodicity, offset . . . | $P_c$ Codebook subset restriction |
| Resource config | Time and frequency position in a subframe | Aperiodic Mode . . . | |
| Time and frequency position in a subframe | Subframe config | PMI/RI report RI reference | |
| Subframe config | Periodicity and subframe offset | CSI process Subframe Pattern | |
| Periodicity and subframe offset | | | |
| Qcl-CRS-info (QCL Type B) | | | |
| CRS information for CoMP | | | |

Configuration for channel state report based on the periodic CSI-RS in the CSI process may be classified into 4 kinds as in Table 1. "CSI-RS config" is to configure frequency and time locations of the CSI-RS REs. Here, through configuration of the number of antennas, the number of ports the corresponding CSI-RS has may be set. "Resource config" configures the RE location in the RB, and "Subframe config" configures a subframe period and an offset.

Table 2 is for configuration of Resource config and Subframe config currently supported in LTE.

TABLE 2

| CSI reference signal | Number of CSI reference signals configured | | | | | |
|---|---|---|---|---|---|---|
| | 1 or 2 | | 4 | | 8 | |
| configuration | (k',l') | $n_s$ mod 2 | (k',l') | $n_s$ mod 2 | (k',l') | $n_s$ mod 2 |
| Frame structure type 1 and 2 | | | | | | |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |
| Frame structure type 2 only | | | | | | |
| 20 | (11,1) | 1 | (11,1) | 1 | (11,1) | 1 |
| 21 | (9,1) | 1 | (9,1) | 1 | (9,1) | 1 |
| 22 | (7,1) | 1 | (7,1) | 1 | (7,1) | 1 |
| 23 | (10,1) | 1 | (10,1) | 1 | | |
| 24 | (8,1) | 1 | (8,1) | 1 | | |
| 25 | (6,1) | 1 | (6,1) | 1 | | |
| 26 | (5,1) | 1 | | | | |
| 27 | (4,1) | 1 | | | | |
| 28 | (3,1) | 1 | | | | |
| 29 | (2,1) | 1 | | | | |
| 30 | (1,1) | 1 | | | | |
| 31 | (0,1) | 1 | | | | |

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Through Table 2 above, a terminal can confirm the frequency and time location, period, and offset. "Qcl-CRS-info" configures quasi co-location information for CoMP. "CSI-IM config" is to configure the frequency and time location of the CSI-IM for measuring interference. Since "CSI-IM" is always configured based on four ports, it is not necessary to configure the number of APs, and "Resource config" and "Subframe config" are configured in the same manner as the CSI-RS.

"CQI report config" exists to configure how the channel state report is to be performed using the corresponding CSI process. The corresponding configuration may include periodic and aperiodic channel state report configuration, PMI/RI report configuration, RI reference CSI process configuration, and subframe pattern configuration. In addition, the corresponding configuration may include PDSCH that is necessary for a terminal to generate the channel state report, Pc that means a power rate between CSI-RS REs, and codebook subset restriction configuring what codebook is to be used.

In the case of the FD-MIMO base station as described above, it is necessary to configure a reference signal resource for measuring channels of 8 or more antennas and to transmit the configured reference signal resource to the terminal, and in this case, the number of reference signals may differ depending on the base station antenna configuration and the measurement type. As an example, in LTE-A release 13, it is possible to configure {1, 2, 4, 8, 12, 16}-port CSI-RSs on the assumption of full port mapping. Here, the full port mapping means that all transceiver units (TXRUs) have dedicated CSI-RS ports for channel estimation.

Figure 2:
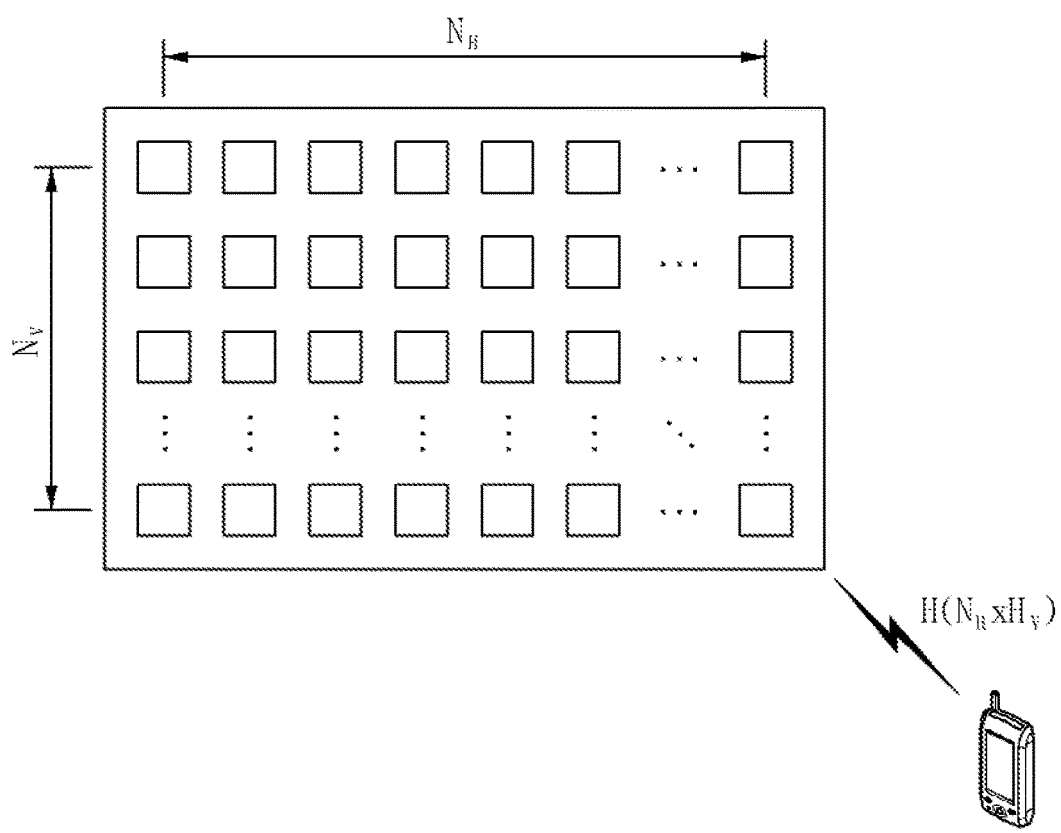
FIG. 2 is a diagram illustrating an example of a multi-dimension antenna array according to an embodiment of the present disclosure.

FIG. 2 is a diagram illustrating an example of a multi-dimension antenna array according to an embodiment of the present disclosure.

Referring to FIG. 2, after LTE-A release 14 as described above, there is a high possibility that 16 or more TXRUs are introduced. Further, shapes of supportable antenna arrays will be greatly increased as compared with release 13. This means that various numbers of TXRUs should be supported in LTE-A release 14. In the full port mapping situation, {18, 20, 22, 24, 26, 28, 30, 32}-port CSI-RSs are considered, and considering that two different polarization antennas may exist in the same location in a polarization antenna structure, {9, 10, 11, 12, 13, 14, 15, 16}-numbered different AP locations may be considered. Further, through the number N1 of different AP locations in the first dimension (vertical or horizontal direction) and the number N2 of different AP locations in the second dimension (horizontal or vertical direction), the shapes of two dimension (2D) rectangular or square antenna arrays can be indicated, and various antenna array shapes may exist in accordance with the number of CSI-RS ports. An example of such multi-dimension antenna array is illustrated in FIG. 2.

In the cellular system, the base station should transmit a reference signal to the terminal in order to measure a downlink channel state, and in the case of the 3GPP LTE-A system, the terminal measures a channel state between the base station and the terminal itself using the CRS or CSI-RS transmitted from the base station. The channel state basically has some requisites that should be considered, and here, it includes the amount of interference in a downlink. The amount of interference in the downlink includes an interference signal and thermal noise generated by antennas that belong to the adjacent base station, and it plays an important role in determining the channel situation of the downlink. As an example, if a base station having one transmission antenna transmits a signal to a terminal having one reception antenna, the terminal should determine energy per symbol that can be received through the downlink and the amount of interference to be simultaneously received in a section in which the corresponding symbol is received using the reference signal received from the base station, and should determine the energy per symbol to interference density ratio (Es/Io). The determined Es/Io is converted into a data transmission speed or a value corresponding to the data transmission speed, and is reported to the base station in the form of a CQI to enable the base station to determine at what data transmission speed the base station is to perform data transmission to the terminal in the downlink.

In the LTE-A system, the terminal feeds information on the channel state of the downlink back to the base station so that the feedback information can be used for downlink scheduling of the base station. That is, the terminal measures the reference signal that the base station transmits to the downlink, and feeds information extracted on the basis of the reference signal back to the base station in the form defined in the LTE and LTE-A standards. In the LTE and LTE-A systems, information that the terminal feeds back to the base station is briefly classified into three kinds as follows.

1. RI: The number of spatial layers that the terminal can receive in the current channel state.

2. PMI: An indicator of a precoding matrix to which the terminal prefers in the current channel state.

3. CQI: The maximum data rate at which the terminal can receive data in the current channel state. The CQI may be replaced by a signal to interference and noise ratio (SINR) that can be used similarly to the maximum data rate, maximum error correction code rate and modulation method, and data efficiency per frequency.

The RI, PMI, and CQI have meanings in association with one another. As an example, the precoding matrix supported in the LTE and LTE-A systems is differently defined per rank. Accordingly, although the PMI value when RI has a value of "1" and the PMI value when RI has a value of "2" are equal to each other, they are differently interpreted. Further, it is assumed that the rank value and the PMI value that the terminal reported to the base station has been applied to the base station even in the case where the terminal determines the CQI. That is, if the rank is RI_X and the precoding is PMI_Y in the case where the terminal has reported RI_X, PMI_Y, and CQI_Z to the base station, it means that the terminal can receive the data rate corresponding to the CQI_Z. As described above, the terminal assumes in what transmission method the terminal performs transmission to the base station when calculating the CQI, and thus it can obtain an optimum performance when performing actual transmission in the corresponding transmission method.

In the case of a base station that possesses a massive antenna to perform the channel state information generation and report, it is necessary for the base station to configure reference signal resources for measuring channels of 8 or more antennas to transmit the reference signal resources to the terminal.

Figure 3:
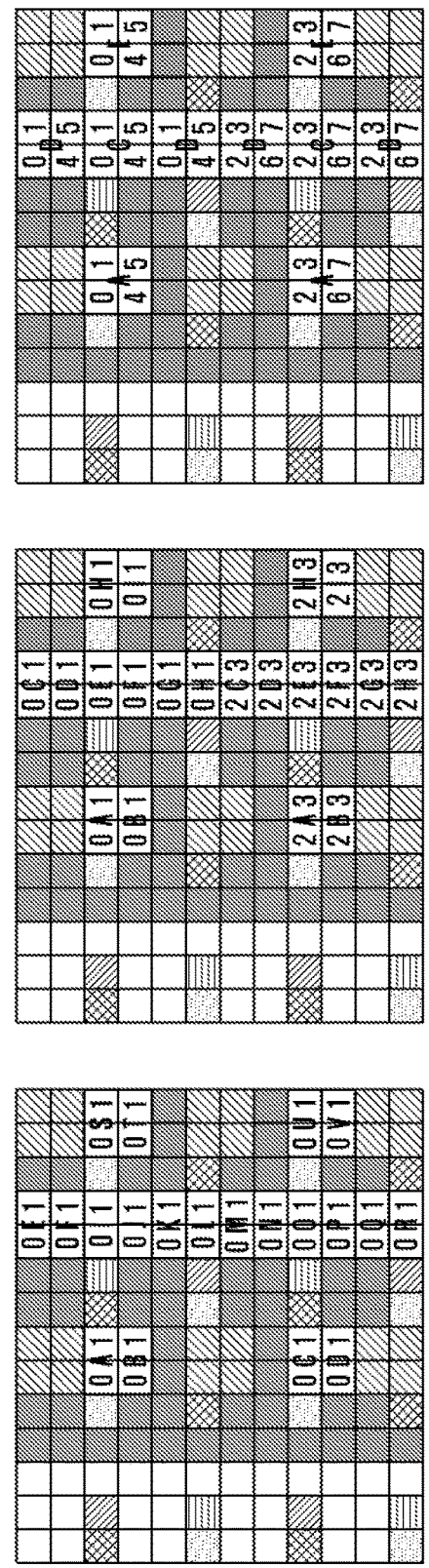
FIG. 3 is a diagram illustrating available channel status indication reference signal (CSI-RS) resources in the case of 2-port, 4-port, and 8-port, respectively according to an embodiment of the present disclosure.

FIG. 3 illustrates available CSI-RS resources in the case of 2-port, 4-port, and 8-port, respectively according to an embodiment of the present disclosure.

Referring to FIG. 3, although an available CSI-RS resource can use maximally 48 REs, it is currently possible to configure up to 8 CSI-RSs for one CSI process. Accordingly, there is a need for a new CSI-RS configuration method to support an FD-MIMO system that can operate based on 8 or more CSI-RS ports.

As an example, in the LTE-A release 13, 1, 2, 4, 8, 12, or 16 CSI-RS ports may be configured in one CSI process. Specifically, {1, 2, 4, 8}-port CSI-RS follow the existing mapping rule, 12-port CSI-RS is configured as an aggregation of three 4-port CSI-RS patterns, and 16-port CSI-RS is configured as an aggregation of two 8-port CSI-RS patterns. Further, in the LTE-A release 13, CDM-2 or CDM-4 is supported using an orthogonal cover code (OCC) of length 2 or 4 with respect to 12-/16-port CSI-RSs.

Further, in the case of CSI-RS power boosting based on CDM-2, maximally 9 dB power boosting is necessary in comparison to the PDSCH for full power utilization for the 12 or 16-port CSI-RSs based on CDM-2. This means that high-performance hardware is necessary in comparison to the existing one for the full power utilization during operation of the 12 or 16-port CSI-RSs based on CDM-2. In the release 13, in consideration of this, the 12 or 16-port CSI-RSs based on CDM-4 have been introduced, and in this case, the full power utilization becomes possible through the existing 6 dB power boosting. In addition, in the release 14, CDM-8 based CSI-RSs have been introduced for CSI-RSs up to 32-port.

In order to support up to 32 antennas, Rel-13 FD-MIMO and Rel-14 evolved FD-MIMO of LTE support non-precoded CSI-RS (class A) and beamformed CSI-RS (class B). Table 3 below indicates that eMIMO-type has been configured for resources required for the Rel-13 terminal to support the non-precoded CSI-RS and the beamformed CSI-RS.

TABLE 3

```
(a) eMIMO-type configuration in the CSI-process
-- ASN1START
CSI-Process-r11 ::=                    SEQUENCE {
    csi-ProcessId-r11                      CSI-ProcessId-r11,
    csi-RS-ConfigNZPId-r11                 CSI-RS-ConfigNZPId-r11,
    csi-IM-ConfigId-r11                    CSI-IM-ConfigId-r11,
    p-C-AndCBSRList-r11                    P-C-AndCBSR-Pair-r13a,
    cqi-ReportBothProc-r11                 CQI-ReportBothProc-r11
    OPTIONAL,                      -- Need OR
    cqi-ReportPeriodicProcId-r11                      INTEGER (0..maxCQI-ProcExt-
r11)            OPTIONAL,          -- Need OR
    cqi-ReportAperiodicProc-r11            CQI-ReportAperiodicProc-r11
                  OPTIONAL,                  -- Need OR
    ...,
    [[          alternativeCodebookEnabledFor4TXProc-r12         ENUMERATED
{true}         OPTIONAL,    -- Need ON
            csi-IM-ConfigIdList-r12               CHOICE {
                release                                  NULL,
                setup                       SEQUENCE (SIZE (1..2)) OF
CSI-IM-ConfiqId-r12
            }
                OPTIONAL,        -- Need ON
            cqi-ReportAperiodicProc2-r12          CHOICE {
                release                                  NULL,
                setup                    CQI-ReportAperiodicProc-r11
            }
                      OPTIONAL   -- Need ON
    ]],
    [[          cqi-ReportAperiodicProc-v1310        CHOICE {
                release                                  NULL,
                setup                                            CQI-
ReportAperiodicProc-v1310
            }
                      OPTIONAL,              -- Need ON
            cqi-ReportAperiodicProc2-v1310        CHOICE {
                release                                  NULL,
                setup                                            CQI-
ReportAperiodicProc-v1310
            }
                      OPTIONAL,              -- Need ON
            eMIMO-Type-r13             CSI-RS-ConfigEMIMO-r13
                      OPTIONAL            -- Need ON
    ]]
}
-- ASN1STOP
(b) Parameter configuration in eMIMO-Type configuration
-- ASN1START
CSI-RS-ConfigEMIMO-r13 ::=       CHOICE {
    release                                       NULL,
    setup                                       CHOICE {
            nonPrecoded-r13               CSI-RS-ConfigNonPrecoded-r13,
            beamformed-r13                CSI-RS-ConfigBeamformed-r13
    }
}
CSI-RS-ConfigNonPrecoded-r13 ::=                         SEQUENCE {
    p-C-AndCBSRList-r13                              P-C-AndCBSR-Pair-r13
                  OPTIONAL,       -- Need OR
    codebookConfigN1-r13           ENUMERATED {n1, n2, n3, n4, n8},
    codebookConfigN2-r13           ENUMERATED {n1, n2, n3, n4, n8},
    codebookOverSamplingRateConfig-O1-r13           ENUMERATED {n4, n8}
            OPTIONAL,    -- Need OR
    codebookOverSamplingRateConfig-O2-r13           ENUMERATED    {n4,n8}
                  OPTIONAL,       -- Need OR
    codebookConfig-r13                                INTEGER (1..4),
    csi-IM-ConfigIdList-r13                           SEQUENCE (SIZE
(1..2)) OF CSI-IM-ConfigId-r13          OPTIONAL, -- Need OR
    csi-RS-ConfigNZP-EMIMO-r13                           CSI-RS-
ConfigNZP-EMIMO-r13            OPTIONAL   -- Need ON
}
CSI-RS-ConfigBeamformed-r13 ::=                   SEQUENCE {
    csi-RS-ConfigNZPIdListExt-r13                     SEQUENCE (SIZE
(1..7)) OF CSI-RS-ConfigNZPId-r13         OPTIONAL,    -- Need OR
    csi-IM-ConfigIdList-r13                           SEQUENCE (SIZE
```

TABLE 3-continued

```
(1..8)) OF CSI-IM-ConfigId-r13                OPTIONAL,  -- Need OR
    p-C-AndCBSR-PerResourceConfigList-r13              SEQUENCE (SIZE (1..8))
OF P-C-AndCBSR-Pair-r13                  OPTIONAL,  -- Need OR
    ace-For4Tx-PerResourceConfigList-r13               SEQUENCE (SIZE (1..7))
OF BOOLEAN     OPTIONAL,      -- Need OR
    alternativeCodebookEnabledBeamformed-r13    ENUMERATED {true}
OPTIONAL,          -- Need OR
    channelMeasRestriction-r13                          ENUMERATED {on}
                  OPTIONAL       -- Need OR
}
-- ASN1STOP
```

Figure 4:
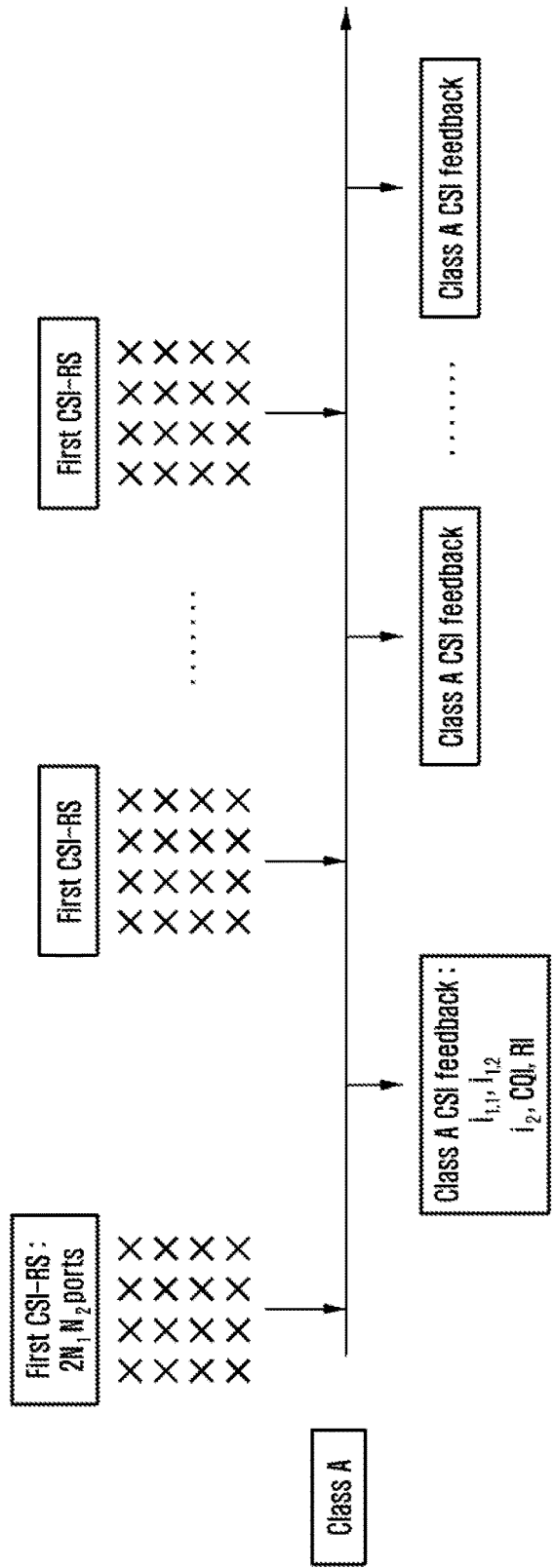
FIG. 4 is a diagram exemplifying an operation of a non-precoded CSI-RS according to an embodiment of the present disclosure.
Figure 5:
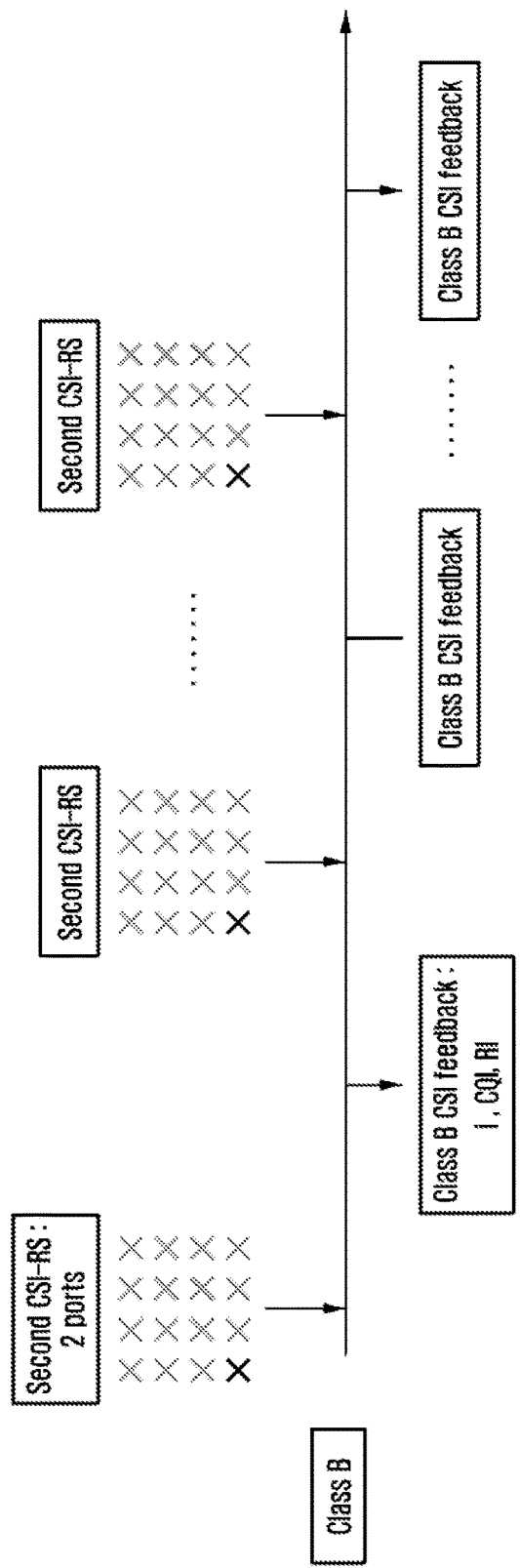
FIG. 5 is a diagram exemplifying an operation of a user equipment (UE)-specific beamformed CSI-RS according to an embodiment of the present disclosure.

FIG. 4 is a diagram exemplifying an operation of a non-precoded CSI-RS according to an embodiment of the present disclosure, and FIG. 5 is a diagram exemplifying an operation of a UE-specific beamformed CSI-RS according to an embodiment of the present disclosure.

Referring to FIGS. 4 and 5, in the case of the non-precoded CSI-RS, a terminal reports RI/PMI/CQI to a base station based on respective measured antennas based on wide beams like the existing ones, and the base station performs data scheduling based on this. In the case of the beamformed CSI-RS, in order to reduce the number of CSI-RS ports that the terminal should measure at a time and to reduce overhead for the whole CSI-RS, the base station divides the whole wide area into specific beams to be transmitted, and the terminal selects this, so that the overhead for the reference signal and terminal complexity can be reduced.

The beamformed CSI-RS may be divided into a cell-specific CSI-RS and a UE-specific CSI-RS in accordance with the number K of CSI-RSs that the base station configures to the terminal for the beamformed CSI-RS transmission. As described above, different from the cell-specific CSI-RS that proceeds with the channel state report through selection of divided beams in a cell dimension, the UE-specific CSI-RS transmits an optimized beam to the terminal so that the terminal reports the channel state based on this, and thus the reference signal overhead can be minimized. Accordingly, in the case of the cell-specific beamformed CSI-RS, it is necessary to configure a plurality of CSI-RS resources (K>1) so that the terminal can compare them with each other, and in the case of the UE-specific beamformed CSI-RS, one resource (K=1) is configured to make the terminal report the channel state information.

Although the UE-specific CSI-RS has a low overhead as compared with the cell-specific CSI-RS, this method has the drawback that prior channel state information should be secured using the SRS, non-precoded CSI-RS, and cell-specific beamformed CSI-RS. Accordingly, in order to combine the above-described advantages and to make up for the shortcomings thereof, a hybrid CSI-RS or a hybrid CSI, in which the above-described CSI-RSs are combined with each other, may be used.

Figure 6:
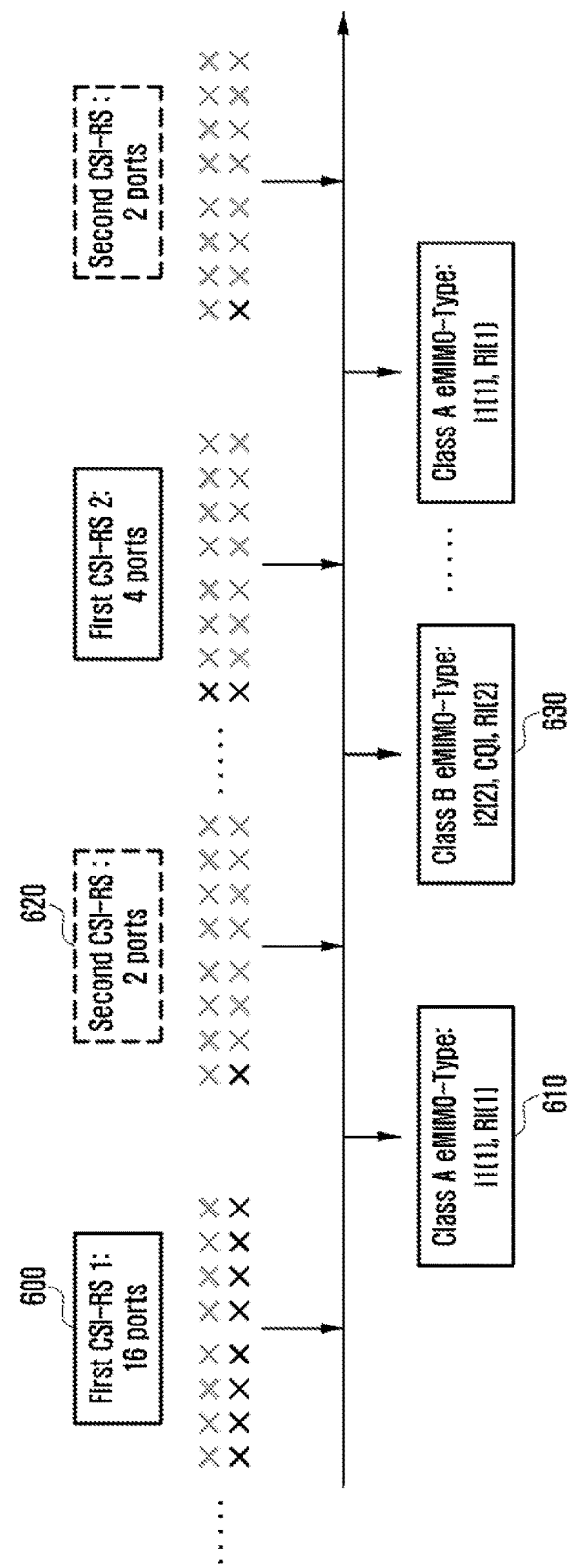
FIG. 6 is a diagram exemplifying an operation of a hybrid CSI-RS according to an embodiment of the present disclosure.

FIG. 6 is a diagram exemplifying an operation of a hybrid CSI-RS according to an embodiment of the present disclosure.

Referring to FIG. 6, in the case of a hybrid CSI, the terminal operates to combine two or more CSI-RSs or CSI types. Accordingly, for such an operation, two or more eMIMO-types should be configured. Such two eMIMO-types may be the first eMIMO-type (600) and the second eMIMO-type (620). In this case, the first eMIMO-type reports only RI(1) and $i_1(1)$ (610). In the case of the RIs, in order to report selection of the number of supportable beams, the terminal may report only two RIs to the base station, and the corresponding values may be "1" and "3". In addition to the RI report, the terminal may report $i_1(1)$ with respect to the first eMIMO-type, and the $i_1(1)$ serves to notify the base station of the selection of a beam group in addition to the number of selected beams in accordance with the RI report of the terminal.

The base station may transmit the CSI-RS for the second eMIMO-type based on the channel state information report of the first eMIMO-type (620), and the terminal may report $i_2(2)$, CQI, and RI(2) through measurement of the CSI-RS (630). Such a report may be the same as the existing UE-specific CSI-RS (class B with K=1). In addition, if the first eMIMO-type is class B with K>1, CQI may be reported rather than RI(1) and $i_1(1)$, and the operation of the second eMIMO-type is the same as the operation of the first eMIMO-type.

If the hybrid CSI operation is performed using a periodic channel state report, it is preferable to minimize the relationship between the first eMIMO-type and the second eMIMO-type. In this case, even if the channel state report for the first eMIMO-type CSI-RS transmitted by the terminal has not been accurately received, the base station can perfectly use information of the second eMIMO-type. Further, if the report period of the channel state of the first eMIMO-type may be integer times the report period of RI(2) of the second eMIMO-type, and the corresponding integer may be configured through an RRC.

Table 4 and Table 5 indicate aperiodic channel state report trigger in LTE.

TABLE 4

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

TABLE 5

| Value of CSI request field | Description |
| --- | --- |
| '000' | No aperiodic CSI report is triggered |
| '001' | Aperiodic CSI report is triggered for a set of CSI process(es) configured by higher layers for serving cell c |
| '010' | Aperiodic CSI report is triggered for a $1^{st}$ set of CSI process(es) configured by higher layers |
| '011' | Aperiodic CSI report is triggered for a $2^{nd}$ set of CSI process(es) configured by higher layers |

TABLE 5-continued

| Value of CSI request field | Description |
|---|---|
| '100' | Aperiodic CSI report is triggered for a 3$^{rd}$ set of CSI process(es) configured by higher layers |
| '101' | Aperiodic CSI report is triggered for a 4$^{th}$ set of CSI process(es) configured by higher layers |
| '110' | Aperiodic CSI report is triggered for a 5$^{th}$ set of CSI process(es) configured by higher layers |
| '111' | Aperiodic CSI report is triggered for a 6$^{th}$ set of CSI process(es) configured by higher layers |

In Table 4, "serving cell c" means a downlink component carrier (CC) linked to an uplink CC indicated by a carrier indication field (CIF) included in a DCI for uplink scheduling in contrast with a case where an aperiodic feedback indicator is composed of one bit. That is, if the aperiodic feedback indicator configured to "01" is received, the terminal transmits feedback information of the downlink CC linked to the uplink CC indicated by the CIF. In contrast, if the aperiodic feedback indicator configured to "10" or "11" is received, the terminal transmits feedback information of the downlink CC configured by higher layers with respect to the uplink CC. In the same manner as the two-bit indicator, three-bit aperiodic feedback indicator also performs a similar operation.

In the above-described hybrid CSI operation, two kinds of methods can be performed to trigger the aperiodic channel state information report. First is a method for reporting only one of two eMIMO-types, and second is a method for reporting both the two eMIMO-types. According to the present disclosure, a method for reporting the aperiodic channel state is described.

First Embodiment

The first method is a method for reporting only one of two eMIMO-types. In order to make the terminal report one of two eMIMO-types, the base station may notify the terminal as to what eMIMO-type is to be reported using an indication of the base station. For example, if the indication is "0", channel state information of the first eMIMO-type may be reported, whereas if the indication is "1", channel state information of the second eMIMO-type may be reported. Such an indication method may be as follows.

eMIMO-type indication method 1 for reporting aperiodic channel state information: Indication through RRC configuration eMIMO-type indication method 2 for reporting aperiodic channel state information: Indication through DCI The eMIMO-type indication method 1 for reporting the aperiodic channel state information is an indication method through the RRC. Table 6 below exemplifies an RRC field for configuration of such an eMIMO-type report.

TABLE 6

| | | |
|---|---|---|
| CQI-ReportAperiodicProc-r11::= | SEQUENCE { | |
| cqi-ReportModeAperiodic-r11 | CQI-ReportModeAperiodic, | |
| trigger01-r11 | | BOOLEAN, |
| trigger10-r11 | | BOOLEAN, |
| trigger11-r11 | | BOOLEAN |
| } | | |
| CQI-ReportAperiodicProc-v1310 | ::= | SEQUENCE { |
| trigger001-r13 | | BOOLEAN, |
| trigger010-r13 | | BOOLEAN, |
| trigger011-r13 | | BOOLEAN, |
| trigger100-r13 | | BOOLEAN, |
| trigger101-r13 | | BOOLEAN, |
| trigger110-r13 | | BOOLEAN, |
| trigger111-r13 | | BOOLEAN |
| } | | |
| CQI-ReportAperiodic-v1410 | CHOICE { | |
| release | | NULL, |
| setup | | SEQUENCE { |
| trigger1-eMIMO-TypeIndicator-r14 | | BIT STRING, |
| trigger2-eMIMO-TypeIndicator-r14 | | BIT STRING, |
| trigger3-eMIMO-TypeIndicator-r14 | | BIT STRING, |
| trigger4-eMIMO-TypeIndicator-r14 | | BIT STRING, |
| trigger5-eMIMO-TypeIndicator-r14 | | BIT STRING, |
| trigger6-eMIMO-TypeIndicator-r14 | | BIT STRING, |
| trigger7-eMIMO-TypeIndicator-r14 | | BIT STRING, |
| } | | |

In CQI-ReportAperiodic-v1410 in the above table, the base station may configure how respective eMIMO-types are triggered through trigger1-eMIMO-typeIndicator-r14 to trigger7-eMIMO-TypeIndicator-r14. For example, if the corresponding value is "0", the corresponding trigger reports the first eMIMO-type, whereas if the corresponding value is "1", the corresponding trigger reports the second eMIMO-type. Through such RRC configuration, the terminal can prevent a coverage decrease due to a DCI increase and can report the aperiodic channel state for one eMIMO-type, and implementation complexity of the terminal can be decreased.

In this case, the size of a bitmap of eMIMO-TypeIndicator in the above table may be equal to the total number of configurable CSI processes in the corresponding trigger. For example, in the case of trigger 01 or 001 of the aperiodic channel state report, as a report for one cell, only up to 4 CSI processes can be triggered. In this case, trigger1-eMIMO-TypeIndicator-r14 for the corresponding trigger may be composed of 4 bits. Further, in the case of fields excluding 01 or 001 (e.g., 10, 010, 100, and 110), up to 5 CSI processes can be triggered, and thus trigger1-eMIMO-TypeIndicator-r14 may be composed of 5 bits.

As another method, there is a method in which the corresponding configuration bit is configured to a hybrid CSI, and interlocks with the number of CC or CSI processes having two eMIMO-types. For example, if 5 CSI processes are configured to trigger 010, and two eMIMO-types are configured in three of them, the terminal may configure three bits as trigger2-eMIMO-TypeIndicator-r14 for the corresponding trigger 010.

Further, the two methods as described above may be mixed. The trigger 01 or 001 may have a different number of CSI processes for supporting the hybrid CSI in the corresponding cell as an indication for a serving cell indicated by a CIF field. Accordingly, 01 or 001 field always uses 4-bit configuration, and configuration for the remaining trigger fields may interlock with the number of CSI processes in which the hybrid CSI is configured.

The above-described indication and configuration methods have the advantages that when the base station configures the RRC field to the terminal, the amount of configuration fields is minimized, and the configuration can be efficiently instructed with respect to the terminal.

As another method, there is a method for using the configuration having a number of bits that is equal to the number of CCs. In this case, if the corresponding trigger is composed of 5 bits, the trigger field for eMIMO-type indication also has the same size, and if the corresponding trigger is composed of 32 bits, 32 bits are used in the same manner.

In the above-described RRC configuration method, the leftmost bit of the RRC configuration may be indicated in the order of the CC or CSI process having the lowest serving cell index (e.g., ServCellIndex=0) and the lowest CSI process ID to the CC or CSI process having the highest serving cell index and the highest CSI process ID among the CCs or CSI processes configured to the corresponding trigger.

An eMIMO-type indication method 2 for reporting aperiodic channel state information is an indication method through the DCI. In the same manner as the RRC field as described above, if the corresponding value indicated through the DCI is "0", the CC or CSI process that is triggered through the corresponding aperiodic channel state report trigger reports the first eMIMO-type, and if the corresponding value is "1", the CC or CSI process reports the second eMIMO-type. Through such DCI indication, the aperiodic channel state for only one eMIMO-type can be reported, and through this, implementation complexity of the terminal can be decreased. The DCI indication can be transferred through an uplink DCI for reporting the aperiodic channel state, that is, DCI format 0 or 4, or it is also possible that the indication is made through a common DCI shared by the whole terminals or terminals in a group.

When the eMIMO-type for aperiodic CSI reporting is reported through the uplink DCI, the terminal should accurately know the size of the DCI received in the terminal for accurate PDCCH decoding. The existence/nonexistence of the eMIMO-type DCI bit may be directly or indirectly transferred through the RRC. In this case, if even any one of CC or CSI processes configured to the terminal is configured to support the hybrid CSI, or any one of CC or CSI processes configured to report the aperiodic channel state to the terminal is configured to support the hybrid CSI, such a DCI field may exist.

In this case, the size of the bitmap of the DCI indication may be one bit. In this case, the eMIMO-type indicated according to the corresponding DCI is applied to the CSI process or CC to which all hybrid CSIs triggered through the corresponding DCI have been configured. In this case, if the CSI process or CC exists, to which the hybrid CSI has not been configured among the triggered CSI processes or CCs, the one-bit indication may be disregarded.

Further, there is a method in which the size of the bitmap of the DCI indication interlocks with the maximum number of CCs or CSI processes configured in the whole aperiodic channel state report trigger field. For example, if 5 CCs or CSI processes are configured to the trigger 010 and 4 CSI processes are configured to the trigger 001, the largest bit "5" is supported for the DCI.

As another method, there is a method in which the size of the bitmap is configured to the hybrid CSI in the whole aperiodic channel state report trigger field and interlocks with the number of CCs or CSI processes having two eMIMO-types. For example, if 5 CSI processes for supporting the hybrid CSI are configured to the trigger 010 and 3 CSI processes for supporting the hybrid CSI are configured to the trigger 001, the largest bit "5" is supported for the DCI.

The above-described indication and configuration methods have the advantages that when the base station configures the RRC field to the terminal, the amount of configuration fields is minimized, and efficient indication can be made with respect to the terminal. Further, if the indication is made using a plurality of bits in the indication method through the DCI, the leftmost bit may be indicated in the order of the CC or CSI process having the lowest serving cell index (e.g., ServCellIndex=0) and the lowest CSI process ID to the CC or CSI process having the highest serving cell index and the highest CSI process ID among the CCs or CSI processes configured to the corresponding indication.

Second Embodiment

The second embodiment relates to a case where, in supporting a hybrid CSI, the terminal reports all eMIMO-types with respect to CC or CSI processes triggered by the base station. In this case, if the terminal updates all pieces of channel state information, complexity of the terminal is increased. Further, if the terminal can update all pieces of channel state information, it is necessary for the base station to confirm whether the corresponding terminal has updated all pieces of channel state information or only one piece of channel state information. Accordingly, the terminal may report such an update capability of the terminal to the base station as UE capability. Table 7 below exemplifies update capability of the terminal.

TABLE 7

```
MIMO-UE-Parameters-r14 ::=    SEQUENCE {
    ...
    hybrid-CSI-nonPrecoded-r14           ENUMERATED
{supported}                  OPTIONAL,
    hybrid-CSI-beamformed-r14            ENUMERATED
{supported}                  OPTIONAL,
    simultaneousUpdate-eMIMOType-r14     ENUMERATED
{supported}                  OPTIONAL,
    ...
}
```

The hybrid-CSI-nonPrecoded is capability for indicating that the terminal supports the hybrid CSI based on a non-precoded CSI-RS and a UE-specific beamformed CSI-RS, and the hybrid-CSI-beamformed is capability for indicating that the terminal supports the hybrid CSI based on a cell-specific beamformed CSI-RS and a UE-specific beamformed CSI-RS. In order to indicate such capability, it is necessary for the terminal to have the capability supporting the non-precoded CSI-RS and the beamformed CSI-RS.

Table 8 below indicates an RRC field that the terminal indicates to the base station if the terminal has the capability for supporting the non-precoded CSI-RS and the beamformed CSI-RS of Rel-13.

TABLE 8

```
MIMO-UE-ParametersPerTM-r13 ::=          SEQUENCE {
    nonPrecoded-r13                          MIMO-
NonPrecodedCapabilities-r13 OPTIONAL,
    beamformed-r13                           MIMO-UE-
BeamformedCapabilities-r13          OPTIONAL,
    channelMeasRestriction-r13               ENUMERATED
{supported}                         OPTIONAL,
    dmrs-Enhancement s-r13                   ENUMERATED
{supported}                         OPTIONAL,
    csi-RS-EnhancementsTDD-r13               ENUMERATED
{supported}                         OPTIONAL
}
```

Although release 13 field has been exemplified, 12 or 16 CSI-RS port based release 13 field and 32 CSI-RS port based release 14 field may be considered in all as the capability, and even if only one of them has been configured, a hybrid CSI capability can be indicated. For example, if release 14 capability indicates that the non-precoded CSI-RS is impossible, but release 13 capability supports the non-precoded CSI-RS, a hybrid CSI capability can be indicated.

The UE capability may be reported for each terminal, or may be simultaneously or dividedly reported for each TM, each band of band combination (BOBC), or both TM and BOBC. In this case, MIMO-UE-Parameters-r14 in the above table may be inscribed as MIMO-UE-ParametersPerTM-r14, MIMO-UE-ParametersPerBoBC-r14, or MIMO-UE-ParametersPerBoBCPerTM-r14.

In addition to hybrid-CSI-nonPrecoded and hybrid-CSI-beamformed in Table 7 as above, simultanousUpdate-eMIMOType indicating update of both two eMIMO-types may be indicated by the terminal if one of hybrid-CSI-nonPrecoded or hybrid-CSI-beamformed as described above is indicated through the terminal.

Based on the UE capability field, the base station and the terminal, in configuring the hybrid CSI, may determine with each other whether to update only one eMIMO-type or all eMIMO-types. First is a method for the base station to directly configure to the terminal. The base station that has confirmed the update capability of the terminal as described above indicates that the terminal always updates all eMIMO-types through configuration to the terminal through the RRC field, and the terminal, in accordance with the indication, may update all eMIMO-types with respect to all CCs or CSI-processes configured to the hybrid CSI. Like the RRC configuration as described above, such configuration may be indicated through one bit, bits in accordance with the number of CCs or CSI processes configured to the hybrid CSI, bits supported by the corresponding trigger, or bits in consideration of the whole CSI processes and CCs.

Second is a method for indirect engagement in accordance with the UE capability. Since frequent update of the channel state report through the terminal is always good for the base station, it can be confirmed that all eMIMO-types are updated only by the UE capability of the terminal without additional indication through the base station, and this method has the advantage of minimizing signaling overhead of the base station and the terminal.

Third Embodiment

The terminal may receive RRC configuration from the base station with respect to methods for reporting only one eMIMO-type or both of two eMIMO-types as described above in the first and second embodiments. Accordingly, if such a field makes the terminal report only one eMIMO-type, the terminal may be indicated by the base station as to what eMIMO-type is to be reported in interlocking with the RRC field or DCI field described above in the first embodiment. If both of the two eMIMO-types are to be reported, the terminal may be configured to always report both of the two eMIMO-types. Since the first embodiment has the advantage that the calculation complexity of the terminal and the overhead for the uplink report can be reduced, and the second embodiment has the advantage that the base station can secure more accurate channel state information, the base station is made to select one of them.

In the case of reporting the eMIMO-type for the aperiodic CSI reporting through the uplink DCI, the terminal should accurately know the size of the DCI received in the terminal for accurate PDCCH decoding. Accordingly, when the method based on the third embodiment is used, existence/nonexistence of such eMIMO-type DCI bits may be directly or indirectly known through such an RRC configuration field.

The hybrid CSI-RS and the hybrid CSI used in the present disclosure may be considered to have the same meaning, and the beamformed and class B have the same meaning. Further, the above-described eMIMO-type may be replaced by a CSI reporting type. In addition, the titles of the RRC and the DCI field as described above may differ as needed. Further, although it is assumed that two kinds of eMIMO-types mainly exist, a larger number of eMIMO-types may also be supported.

In addition, although the aperiodic channel state report is mainly assumed as described above, the present disclosure may also be applied to a periodic channel state report.

Figure 7:
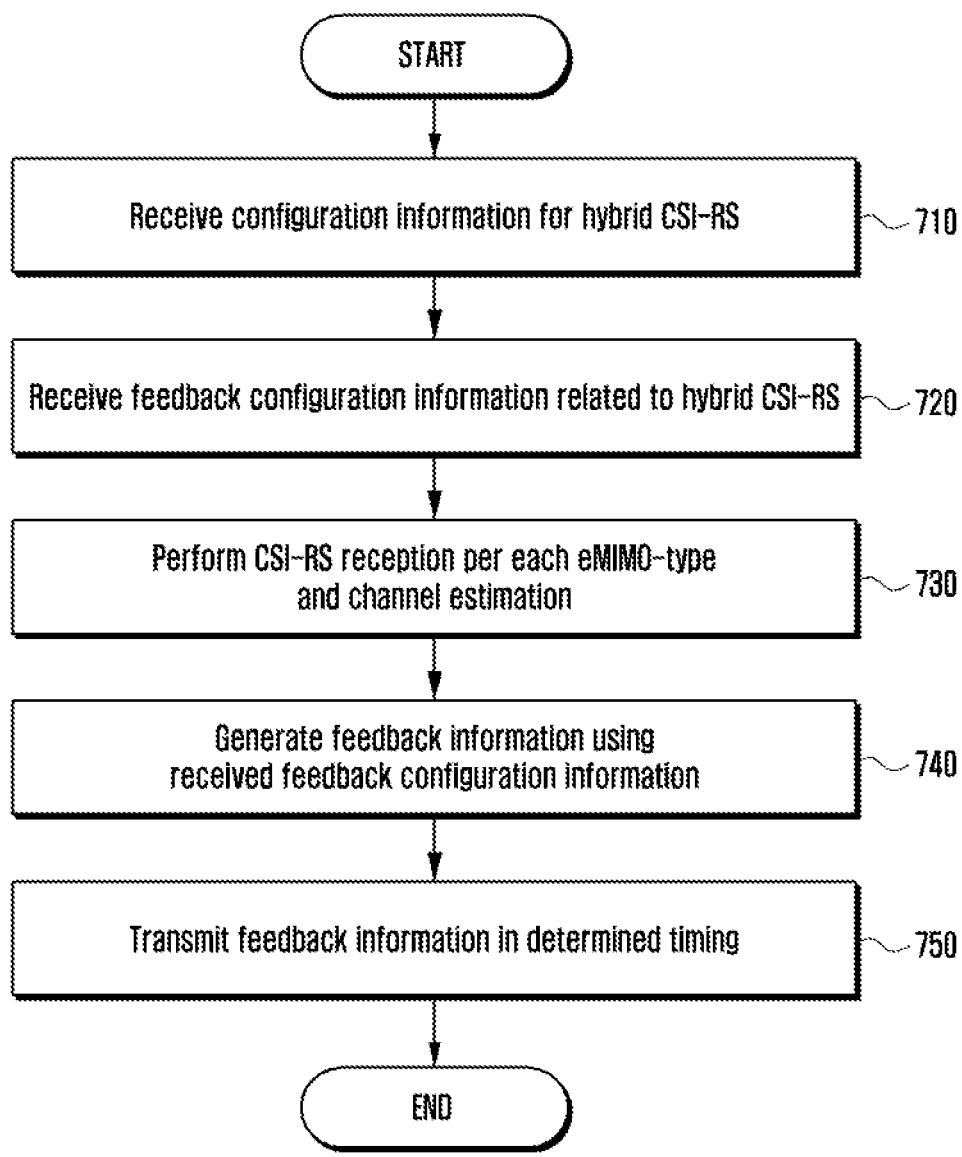
FIG. 7 is a flowchart illustrating an operation of a terminal according to an embodiment of the present disclosure.

FIG. 7 is a flowchart illustrating an operation of a terminal according to an embodiment of the present disclosure.

Referring to FIG. 7, at operation 710, the terminal receives configuration information for hybrid CSI-RS configuration. In this case, if the eMIMO-type is "non-precoded", the terminal may confirm, based on the received configuration information, at least one of the number of CSI-RS ports, antenna numbers N1 and N2 by dimensions, oversampling factors 01 and 02 by dimensions, one subframe configuration for transmitting plural CSI-RSs and a plurality of resource configurations for configuring locations, codebook subset restriction related information, CSI report related information, CSI-process index, and transmission power information. In this case, if the eMIMO-type is "beamformed", the terminal may confirm at least one of resource config and subframe config of a plurality of CSI-RS resources and the number of ports, whether to support a codebook for supporting port selection, and transmission power information. At operation 720, the terminal configures feedback configuration information for the CSI-process supporting a plurality of eMIMO-types. The corresponding information may include PMI/CQI period and offset, RI period and offset, wideband/subband discrimination, and submode. At operation 730, if the terminal receives the CSI-RS based on the corresponding information, it estimates a channel between a base station antenna and a terminal reception antenna. At operation 740, the terminal generates feedback information CRI, rank, PMI, and CQI using the received feedback configuration. In this case, the feedback configuration information may include configuration information for an eMIMO-type proposed in the present disclosure, configuration information for an eMIMO-type to be reported, and configuration information for eMIMO-type update. Thereafter, at operation 750, the terminal transmits the feedback information to the base station in the determined feedback timing in accordance with the feedback configuration of the base station to complete the channel feedback generation and report process considering the 2D array.

Figure 8:
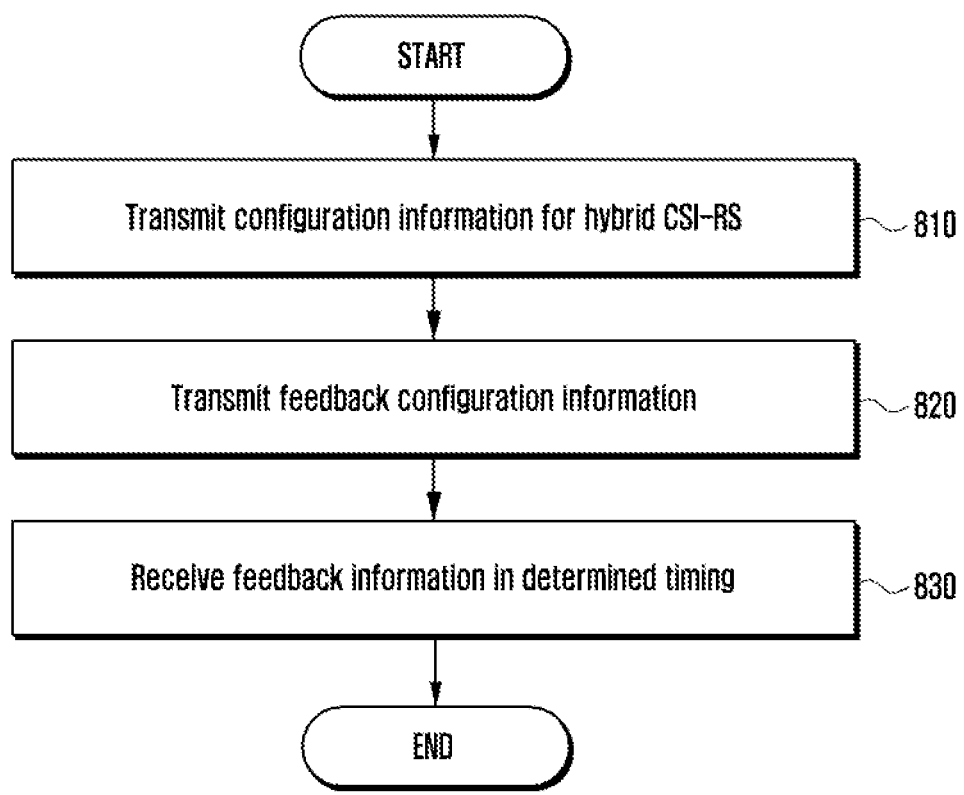
FIG. 8 is a flowchart illustrating an operation of a base station according to an embodiment of the present disclosure.

FIG. 8 is a flowchart illustrating an operation of a base station according to an embodiment of the present disclosure.

Referring to FIG. 8, at operation 810, the base station transmits configuration information for a CSI-RS for measuring a channel to the terminal. In this case, if the eMIMO-type is "non-precoded", the configuration information may include at least one of the number of CSI-RS ports, antenna numbers N1 and N2 by dimensions, oversampling factors 01 and 02 by dimensions, one subframe configuration for transmitting plural CSI-RSs and a plurality of resource configurations for configuring locations, codebook subset restriction related information, CSI report related information, CSI-process index, and transmission power information. In this case, if the eMIMO-type is "beamformed", the configuration information may include at least one of resource config and subframe config of a plurality of CSI-RS resources and the number of ports, whether to support a codebook for supporting port selection, and transmission power information. At operation 820, the base station transmits to the terminal feedback configuration information based on the CSI-RS corresponding to a plurality of eMIMO-types. The corresponding information may include PMI/CQI period and offset, RI period and offset, wideband/subband discrimination, and submode. In this case, the feedback configuration information may include configuration information for an eMIMO-type proposed in the present disclosure, configuration information for an eMIMO-type to be reported, and configuration information for eMIMO-type update. Thereafter, the base station transmits the configured CSI-RS to the terminal. The terminal estimates channels by APs, and based on this, estimates an additional channel for a virtual resource. The terminal determines the feedback, and generates the eMIMO-types to be updated or reported in accordance with the configuration of the base station and corresponding CRI, PMI, RI, and CQI to transmit them to the base station. Accordingly, at operation 830, the base station receives the feedback information from the terminal in the determined timing, and uses the received feedback information in determining the channel state between the terminal and the base station.

Figure 9:
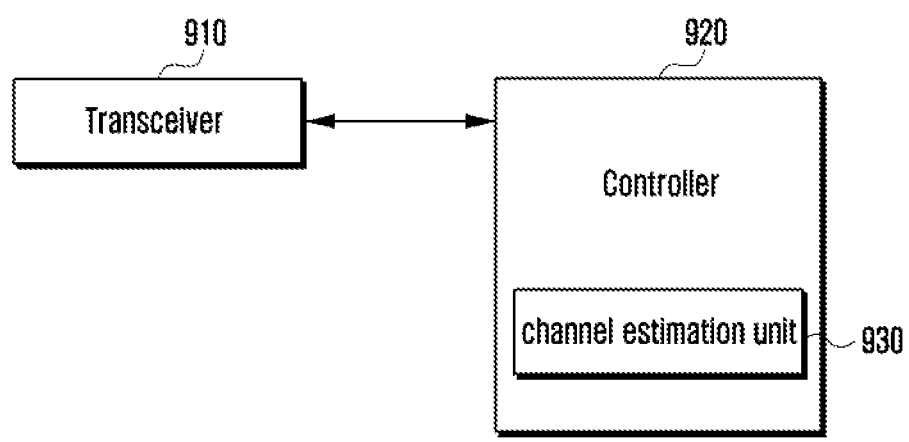
FIG. 9 is a block diagram illustrating an internal structure of a terminal according to an embodiment of the present disclosure.

FIG. 9 is a block diagram illustrating an internal structure of a terminal according to an embodiment of the present disclosure.

Referring to FIG. 9, the terminal includes a transceiver 910 and a controller (i.e., processor) 920. The transceiver 910 transmits/receives data to/from an external source (e.g., base station). Here, the transceiver 910 may transmit feedback information to the base station under the control of the controller 920. The controller 920 controls states and operations of all constituent elements constituting the terminal. For example, the controller 920 generates the feedback information in accordance with the information allocated from the base station. Further, the controller 920 controls the transceiver 910 to feed generated channel information back to the base station in accordance with timing information allocated from the base station. For this, the controller 920 may include a channel estimation unit 930. The channel estimation unit 930 determines necessary feedback information through CSI-RS and feedback allocation information received from the base station, and estimates a channel using the received CSI-RS based on the feedback information.

Although FIG. 9 illustrates an example in which the terminal is composed of the transceiver 910 and the controller 920, the configuration of the terminal is not limited thereto, and various configurations may be further provided in the terminal in accordance with the function performed by the terminal. For example, the terminal may further include a display unit configured to display the current state of the terminal, an input unit configured to receive an input of a signal for performing the function from a user, and a storage unit configured to store data generated in the terminal. Further, it is illustrated that the channel estimation unit 930 is included in the controller 920, but is not limited thereto. The controller 920 may control the transceiver 910 to receive from the base station configuration information for at least one reference signal resource. Further, the controller 920 may control the communication unit 910 to measure the at least one reference signal and to receive from the base station feedback configuration information for generating the feedback information in accordance with the result of the measurement.

Further, the controller 920 may measure the at least one reference signal received through the transceiver 910, and may generate the feedback information in accordance with the feedback configuration information. Further, the controller 920 may control the transceiver 910 to transmit the generated feedback information to the base station in the feedback timing in accordance with the feedback configuration information.

Figure 10:
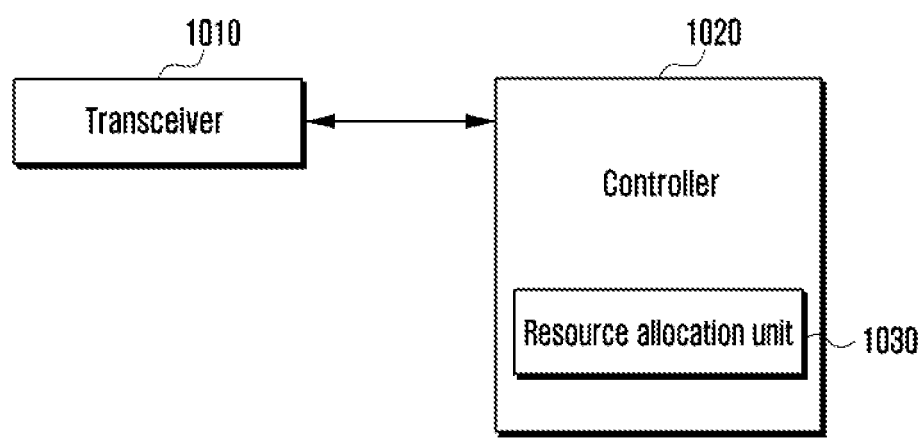
FIG. 10 is a block diagram illustrating an internal structure of a base station according to an embodiment of the present disclosure.

FIG. 10 is a block diagram illustrating an internal structure of a base station according to an embodiment of the present disclosure.

Referring to FIG. 10, the base station includes a transceiver 1010 and a controller (i.e., processor) 1020. The controller 1020 controls states and operations of all constituent elements constituting the base station. Specifically, the controller 1020 allocates a CSI-RS resource for channel estimation of the terminal to the terminal, and allocates a feedback resource and feedback timing to the terminal. For this, the controller 1020 may further include a resource allocation unit 1030. Further, the base station allocates feedback configuration and feedback timing so that feedbacks from several terminals do not collide with each other, receives and analyzes feedback information configured in the corresponding timing. The transceiver 1010 transmits/receives data, a reference signal, and feedback information to/from the terminal. Here, under the control of the controller 1020, the transceiver 1010 transmits an aperiodic CSI-RS to the terminal through allocated resources, and receives the feedback of channel information from the terminal. As described above, it is illustrated that the resource allocation unit 1030 is included in the controller 1020, but is not limited thereto.

The controller 1020 may control the transceiver 1010 to transmit to the terminal configuration information for at least one reference signal, or may generate the at least one reference signal. Further, the controller 1020 may control the communication unit 1010 to transmit to the terminal feedback configuration information for generating the feedback information in accordance with the result of the measurement. Further, the controller 1020 may control the transceiver 1010 to transmit the at least one reference signal to the terminal and to receive the feedback information transmitted from the terminal in the feedback timing in accordance with the feedback configuration information. Further, the controller 1020 may transmit the feedback configuration information to the terminal, transmit an aperiodic CSI-RS to the terminal, and receive from the terminal the feedback information generated based on the feedback configuration information and the CSI-RS. Further, the controller 1020 may transmit the beamformed CSI-RS to the terminal based on the feedback information, and may receive the feedback information generated based on the CSI-RS from the terminal.

According to an embodiment of the present disclosure as described above, when the base station having a transmission antenna having the structure of a large number of 2D antenna arrays transmits the CSI-RS, an excessive allocation of the feedback resources and an increase of the channel estimation complexity of the terminal can be prevented, and the terminal can effectively measure all channels of a large number of transmission antennas, and can configure feedback information as the result of the measurement to report the feedback information to the base station.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving channel state information (CSI), the method comprising:
   transmitting configuration information on hybrid CSI, the configuration information including configuration information on two enhanced multiple input multiple output (eMIMO) types and first information indicating one of the two eMIMO types for which an aperiodic CSI reporting is triggered;
   transmitting second information triggering the aperiodic CSI reporting; and
   receiving aperiodic CSI based on the second information and configuration information,
   wherein the aperiodic CSI is associated with the eMIMO type indicated by the first information.

2. The method of claim 1, wherein the first information is a bit string and each bit included in the bit string indicates one of the two eMIMO types of a corresponding CSI process.

3. The method of claim 1, wherein a length of the first information is equal to a length of corresponding trigger information.

4. The method of claim 1, wherein a length of the first information is a number of CSI processes being available to be configured.

5. The method of claim 1, wherein the first information is composed of 32 bits.

6. A method of reporting channel state information (CSI), the method comprising:
   receiving configuration information on hybrid CSI, the configuration information including configuration information on two enhanced multiple input multiple output (eMIMO) types and first information indicating one of the two eMIMO types for which an aperiodic CSI reporting is triggered;
   receiving second information triggering the aperiodic CSI reporting; and
   transmitting aperiodic CSI based on the second information and configuration information,
   wherein the aperiodic CSI is associated with the eMIMO type indicated by the first information.

7. The method of claim 6, wherein the first is a bit string and each bit included in the bit string indicates one of the two eMIMO types of a corresponding CSI process.

8. The method of claim 6, wherein a length of the first information is equal to a length of corresponding trigger information.

9. The method of claim 6, wherein a length of the first information is a number of CSI processes being available to be configured.

10. The method of claim 6, wherein the first information is composed of 32 bits.

11. A base station for receiving channel state information (CSI), the base station comprising:
    a transceiver configured to transmit and receive signals; and
    a controller coupled with the transceiver and configured to:
       transmit configuration information on hybrid CSI, the configuration information including configuration information on two enhanced multiple input multiple output (eMIMO) types and first information indicating one of the two eMIMO types for which an aperiodic CSI reporting is triggered,
       transmit second information triggering the aperiodic CSI reporting, and
       receive aperiodic CSI based on the second information and configuration information,
    wherein the aperiodic CSI is associated with the eMIMO type indicated by the first information.

12. The base station of claim 11, wherein the first information is a bit string and each bit included in the bit string indicates one of the two eMIMO types of a corresponding CSI process.

13. The base station of claim 11, wherein a length of the first information is equal to a length of corresponding trigger information.

14. The base station of claim 11, wherein a length of the first information is a number of CSI processes being available to be configured.

15. The base station of claim 11, wherein the first information is composed of 32 bits.

16. A terminal for reporting channel state information (CSI), the terminal comprising:
    a transceiver configured to transmit and receive signals; and
    a controller coupled with the transceiver and configured to control to:
       receive configuration information on hybrid CSI, the configuration information including configuration information on two enhanced multiple input, multiple output (eMIMO) types and first information indicating one of the two eMIMO types for which an aperiodic CSI reporting is triggered,
       receive second information triggering the aperiodic CSI reporting, and
       transmit aperiodic CSI based on the second information and configuration information,
    wherein the aperiodic CSI is associated with the eMIMO type indicated by the first information.

17. The terminal of claim 16, wherein the first information is a bit string and each bit included in the bit string indicates one of the two eMIMO types of a corresponding CSI process.

18. The terminal of claim 16, wherein a length of the first information is equal to a length of corresponding trigger information.

19. The terminal of claim 16, wherein a length of the first information is a number of CSI processes being available to be configured.

20. The terminal of claim 16, wherein the first information is composed of 32 bits.

* * * * *